United States Patent [19]

Nagel et al.

[11] Patent Number: 5,394,469
[45] Date of Patent: Feb. 28, 1995

[54] METHOD AND APPARATUS FOR RETRIEVING SECURE INFORMATION FROM MASS STORAGE MEDIA

[75] Inventors: Robert Nagel; Thomas H. Lipscomb, both of New York, N.Y.

[73] Assignee: Infosafe Systems, Inc., New York, N.Y.

[21] Appl. No.: 198,733

[22] Filed: Feb. 18, 1994

[51] Int. Cl.6 .......................... H04L 9/00; H04L 9/06
[52] U.S. Cl. ................................... 380/4; 380/9; 380/23; 380/25; 380/29; 380/49; 380/50
[58] Field of Search ................ 380/4, 9, 23, 24, 25, 380/49, 50, 29

[56] References Cited

U.S. PATENT DOCUMENTS

| | | | |
|---|---|---|---|
| 4,827,508 | 5/1989 | Shear | 380/4 |
| 4,977,594 | 12/1990 | Shear | 380/4 |
| 5,010,571 | 4/1991 | Katznelson | 380/4 |
| 5,050,213 | 9/1991 | Shear | 380/25 |
| 5,136,648 | 8/1992 | Olson et al. | 380/50 |
| 5,247,575 | 9/1993 | Sprague et al. | 380/9 |
| 5,319,705 | 6/1994 | Halter et al. | 380/4 |

*Primary Examiner*—Bernarr E. Gregory
*Attorney, Agent, or Firm*—Karl F. Milde, Jr.

[57] ABSTRACT

A personal computer or "host computer" and a Mass storage device are arranged on an SCSI bus. A "decryption controller", in a separate enclosure outside of the host computer, is also arranged on the SCSI bus. This controller is addressable by the host computer as if it were the mass storage device. Upon receipt of an information request, the decryption controller initiates a request to the mass storage device for the desired information, retrieves this information, decrypts it (if it is encrypted) and then passes it to the host computer. The decryption controller is thus "transparent" to the host computer.

3 Claims, 6 Drawing Sheets

METHOD AND APPARATUS FOR RETRIEVING SECURE INFORMATION FROM MASS STORAGE MEDIA

BACKGROUND OF THE INVENTION

The present invention relates to a system (method and apparatus) for retrieving secure information from a mass storage medium such as a CD-ROM, for temporary storage and usage by an information user.

Systems for storage and retrieval of secure information are well known in the art. As used herein, the term "secure information" is intended to mean information (alphanumeric data, graphics and the like) which is either encrypted or otherwise protected to prevent access thereto except by an authorized user. Such systems have been proposed and are employed both for the case where the information source (database) is centralized, and for the case where the information source has been distributed to multiple users. In the latter case, CD-ROMs have been used to export databases to multiple users so that information storage and retrieval takes place at the user site.

In the U.S. Pat. No. 5,010,571 to Ron Katznelson and the U.S. Pat. Nos. 4,827,508, 4,977,594 and 5,050,213 to Victor Shear, it is proposed to provide encrypted digital information on CD-ROMs at the user site and to monitor and account for each item or "packet" of information which is retrieved and decrypted from a CD-ROM by an authorized user.

This concept of retrieving information on a "pay-as-you-go" basis is also disclosed in the U.S. Pat. No. 5,247,575 of Peter J. Sprague and Thomas H. Lipscomb to include individual access to encrypted data which is "broadcast" to multiple user sites from a central source and/or to provide individual access to encrypted data stored at a central source, using conventional time sharing techniques and transmission via telephone dial-up or local area network (LAN) or wide area network (WAN) communication.

All of these prior art systems permit the user's access to the secure information to be monitored and strictly controlled. This is accomplished, in practice, by maintaining a record at each user site of each information packet which is retrieved and the cost thereof to the user, and then "polling" all user sites from a remote central site, on a regular basis, to retrieve the user data and, if necessary, disable the equipment at one or more user sites to prevent further access to the secure information at these sites.

Systems of this type require specialized electronic circuitry at each user site which operates in cooperation with a central computer at a remote site. Particularly when decryption must be effected at each user site, it is difficult to maintain the security and integrity of this electronic equipment.

Furthermore, the provision of an electronic circuit board, or the like, to a personal computer at a user workstation can (actually or apparently) compromise the integrity of this computer, thus making the system difficult to implement in practice.

SUMMARY OF THE INVENTION

A principal object of the present invention is to provide a method and apparatus for retrieving secure information from a mass storage medium at a user site which is not susceptible to attack or compromise by a user.

It is a further object of the present invention to provide a system for retrieving secure information from a mass storage medium at a user site which does not require a reconfiguration of a personal computer at the user site.

These objects, as well as further objects which will become apparent from the discussion that follows, are achieved, in accordance with the present invention, by providing a personal computer or "host computer" and a mass storage medium reader arranged on an SCSI bus, and providing a "decryption controller", in a separate enclosure outside of the host computer and also arranged on the SCSI bus, which is addressable by the host computer as if it were the storage medium reader. Upon receipt of an information request, the decryption controller initiates a request to the storage medium reader for the desired information, retrieves this information, decrypts it if it is encrypted, and then passes it to the host computer. The decryption controller is thus "transparent" to the host computer.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
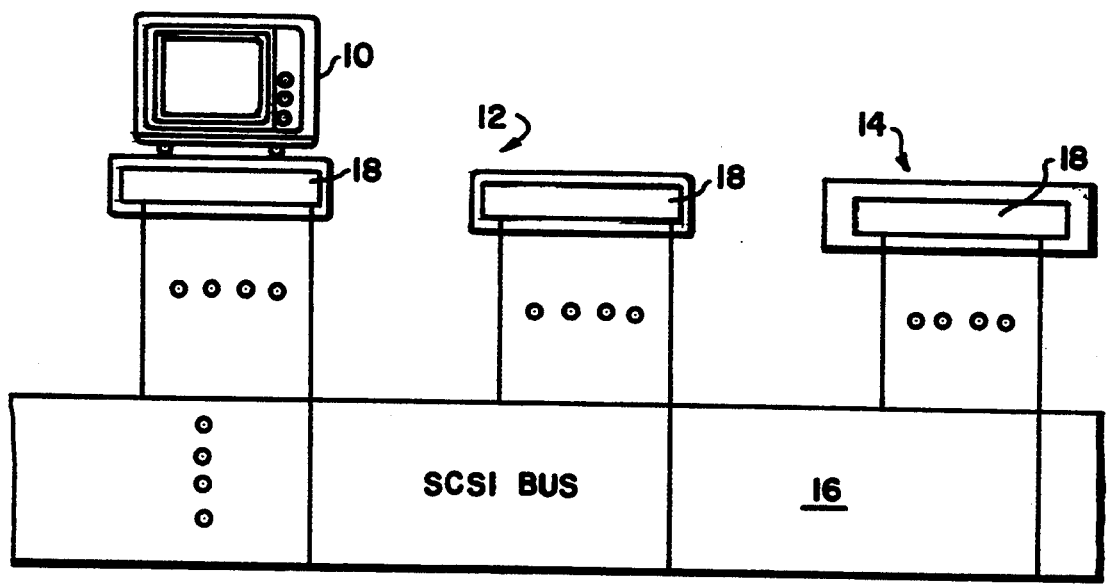
FIG. 1 is a representative diagram of a workstation comprising a personal computer (PC), a CD-ROM reader and a decryption controller all arranged on an SCSI bus.

The preferred embodiments of the present invention will now be described with reference to FIGS. 1-7 of the drawings. Identical elements in the various figures are designated with the same reference numerals.

FIG. 1 illustrates the general nature of the system according to the present invention. As shown here, the system involves a digital computer workstation which is capable of retrieving secure data from a database stored on one or more CD-ROMs.

In order to prevent unauthorized access to the stored information, at least some of the individual items of information ("information packets") are encrypted prior to storage on a CD-ROM. Some of the information packets may also be stored in decrypted (cleartext) form on a CD-ROM and can be retrieved by any workstation user by means of a CD-ROM reader. However, only an authorized user with a proper validated code is allowed to decrypt the encrypted information packets.

Upon release of the secure and, if desired, the non-secure information to an authorized user, the user is charged a preset fee set by the information provider (copyright owner or publisher of the information). This charge is effected automatically by debiting a financial account which has previously been established between the user and the information provider.

To implement this system, there is provided a workstation comprising a personal computer (PC) 10, a CD-ROM reader 12 and a decryption controller 14. These three devices, which may be stand-alone devices each arranged in a separate enclosure or combined in one or two enclosures—e.g., the PC 10 in one enclosure and the CD-ROM reader 12 and controller 14 in another—are connected in a well-known manner to a Small Computer System Interface ("SCSI") bus 16 via a bus interface and controller 18.

The personal computer 10 and the CD-ROM reader 12 are conventional devices which are available commercially. The decryption controller is a special purpose device which operates to receive encrypted data from the CD-ROM reader, decrypt this data if authorized to do so, and transport the decrypted data to the host computer 10 for storage either in its active memory (RAM) or hard disk drive.

The decryption controller also keeps a running account of the identity of, and charge for each information packet which is decrypted for later transmission, e.g. by telephone line, to a central billing facility at a remote site. A monitoring facility of this type is known from the aforementioned U.S. Pat. Nos. 5,010,571; 4,827,5089 and 5,247,575.

Once an information packet is decrypted and transferred to the host computer 10, the workstation user can display it on the computer screen, print out a hard copy and/or transmit a copy by LAN or modem to another workstation.

In accordance with the SCSI standard, the SCSI bus extends no more than twenty-six feet in length from end to end and is provided with terminating impedances at each end. Each unit arranged on the bus is provided with a unique address from a maximum of eight addresses (zero to seven). The computer is usually given the address number seven; the addresses of the other devices on the bus may be selected from zero to seven with a manual switch arranged on each device.

In the preferred embodiment of the present invention, the decryption controller 14 is disposed in its own enclosure, separate and apart from the personal computer 10 and possibly also the CD-ROM reader 12. To safeguard the firmware and codes which are used by the electronic circuitry, the decryption controller may be provided with light-sensitive, erasable memory circuits so that the contents of memory are erased if and when the enclosure is opened.

Figure 2:
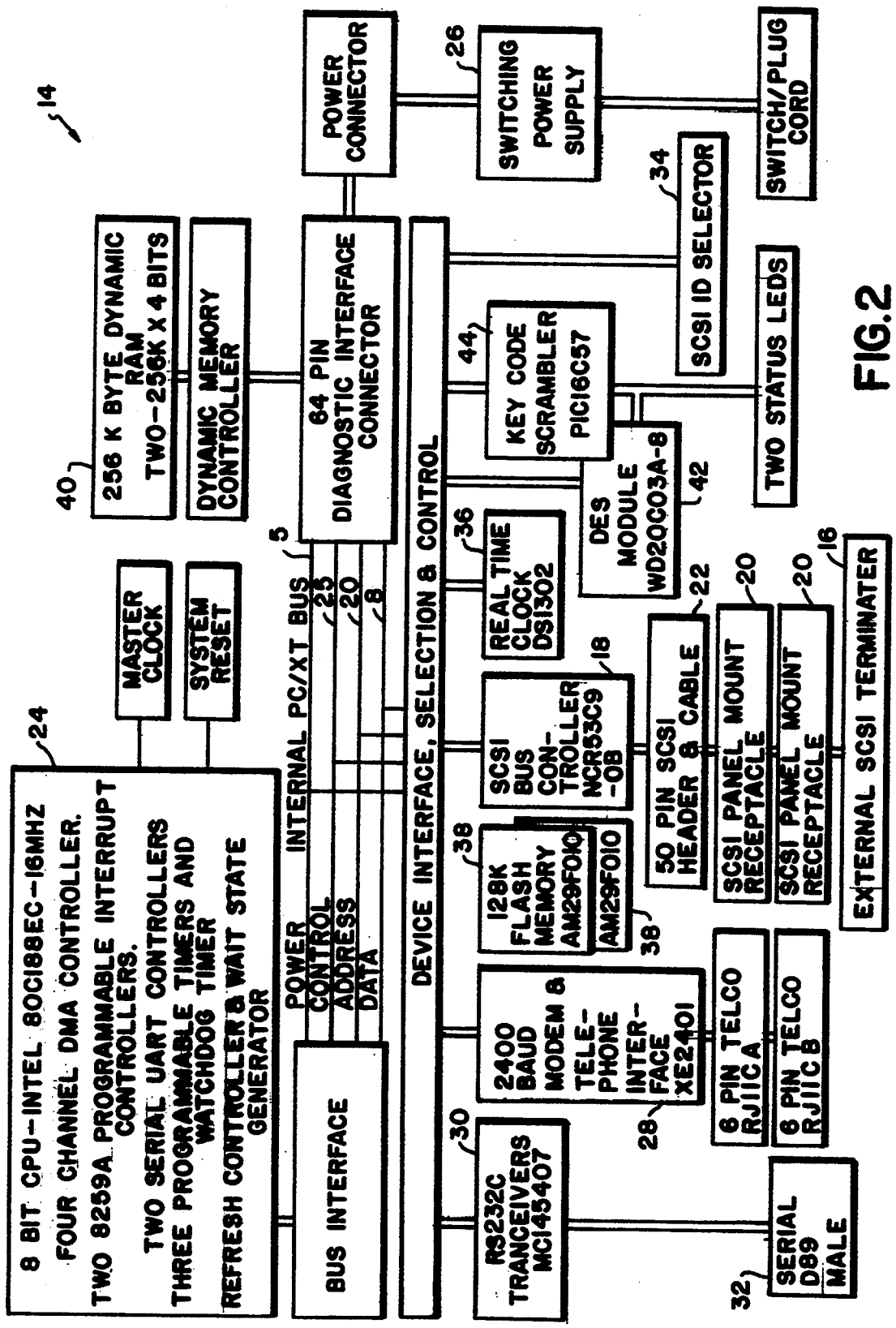
FIG. 2 is a block diagram of a decryption controller for use in the system of FIG. 1.

FIG. 2 shows a preferred embodiment of the decryption controller. This device is connected to the SCSI bus 16 via receptacles 20 and a fifty pin header 22. The SCSI bus controller 18 operates in conjunction with a CPU 24 to receive requests for data from the host computer 10 and initiate requests for this data from the CD-ROM reader 12.

The device is provided with its own separate power supply 26 so that it operates completely independently of the host computer 10.

The decryption controller is also provided with a 2400 baud modem and telephone interface 28 so that it may communicate with a central billing computer at a remote site. This central billing computer routinely calls the decryption controller 18 at regular intervals—for example, each night—to download the logged information concerning each information packet (IP) that was decrypted, and/or to credit the financial account maintained by the decryption controller when the workstation user makes payment.

The decryption controller 18 can also communicate with other devices, such as printers or the like, by means of an RS-232C transceiver 30 and an associated serial port connector 32.

The SCSI address is set from zero to six by a manual ID selector 34. Date and time are provided by a real time clock 36.

Firmware for the decryption controller is provided on two 128K flash memory chips 38; intermediate scratch pad storage is provided by a 256K dynamic RAM 40.

Decryption of encrypted data is effected by a Data Encryption Standard (DES) module 42 which operates in conjunction with a key code scrambler 44. The key code scrambler maintains the keys used by the DES module for decryption. Alternatively, the decryption function and/or the key code scrambler function may be implemented in software (firmware) operating in the CPU 24.

All keys utilized by the system are created and maintained in the decryption controller so that neither the workstation user nor the PC 10 will have access to these keys.

All of the electronic circuit devices contained in the decryption controller of FIG. 2 are standard, commercially available devices. Part numbers are shown in FIG. 2 for the major components.

In a preferred embodiment of the invention, the system of FIG. 1 and, in particular, the decryption controller of FIG. 2, operates in the manner shown by the flow charts of FIG. 3–7.

Figure 3:
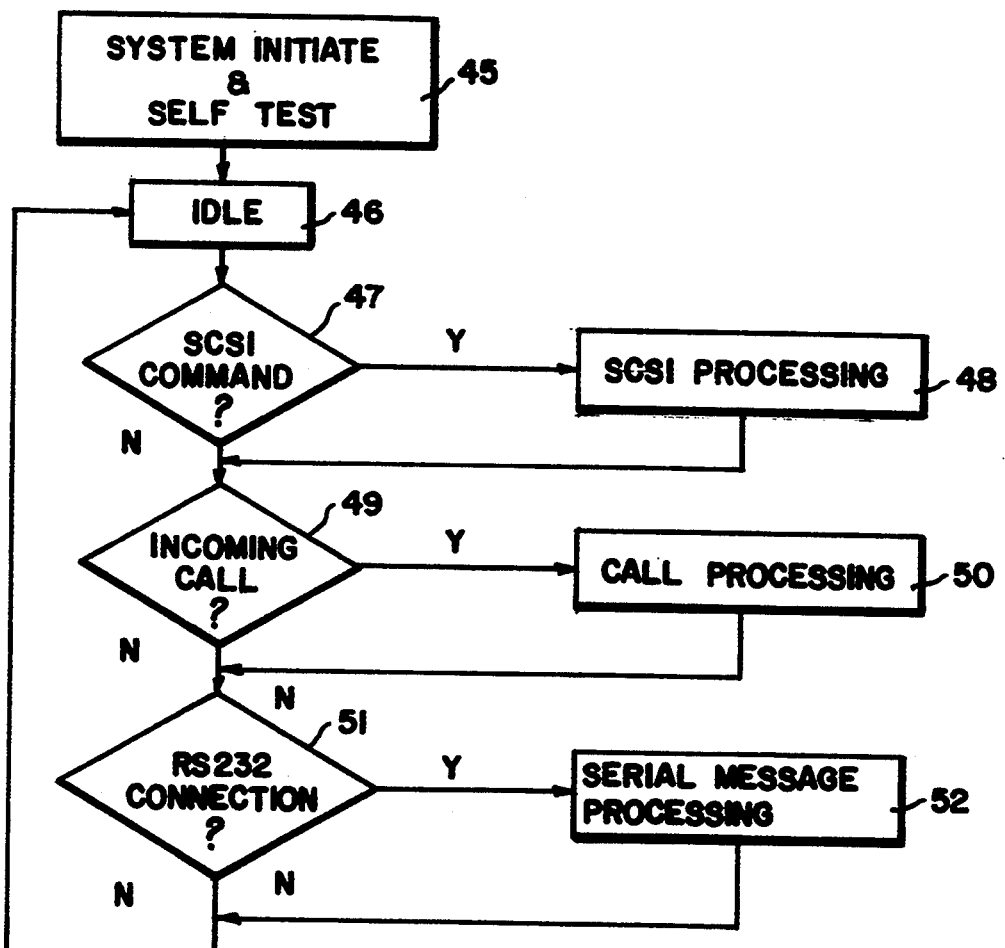
FIG. 3 is a flow chart showing the general operation of the decryption controller of FIG. 2.

When first switched on, the CPU 24 executes a self-test routine as is conventional in the art (Block 45 in FIG. 3). Error messages are communicated to the host computer via the SCSI bus for display to the system user. Thereafter, the CPU enters the idle mode (Block 46) and awaits an interrupt.

If the decryption controller receives an SCSI command from the host computer (Block 47) it processes this command (Block 48) as will be described hereinafter in connection with FIG. 4. If the decryption controller receives an incoming telephone message (Block 49) from a central billing computer, it processes this message (Block 50) before proceeding. Typical telephone messages are set forth in Table I:

TABLE I

Set Credit (in financial account)
Set Item Price
Set User Password
Clear Financial Account to Zero
Get Financial Account Information
Get User Information
Create User Information
Remove User Information
Send User a Message Similarly, if an RS232 connection is established (Block 51), permitting communication either to or from the decryption controller, the controller either transmits information, for example to a printer, or receives a serial message of the type noted above. In this case, the serial message is processed (Block 52) and the controller returns to the idle state.

Figure 4:
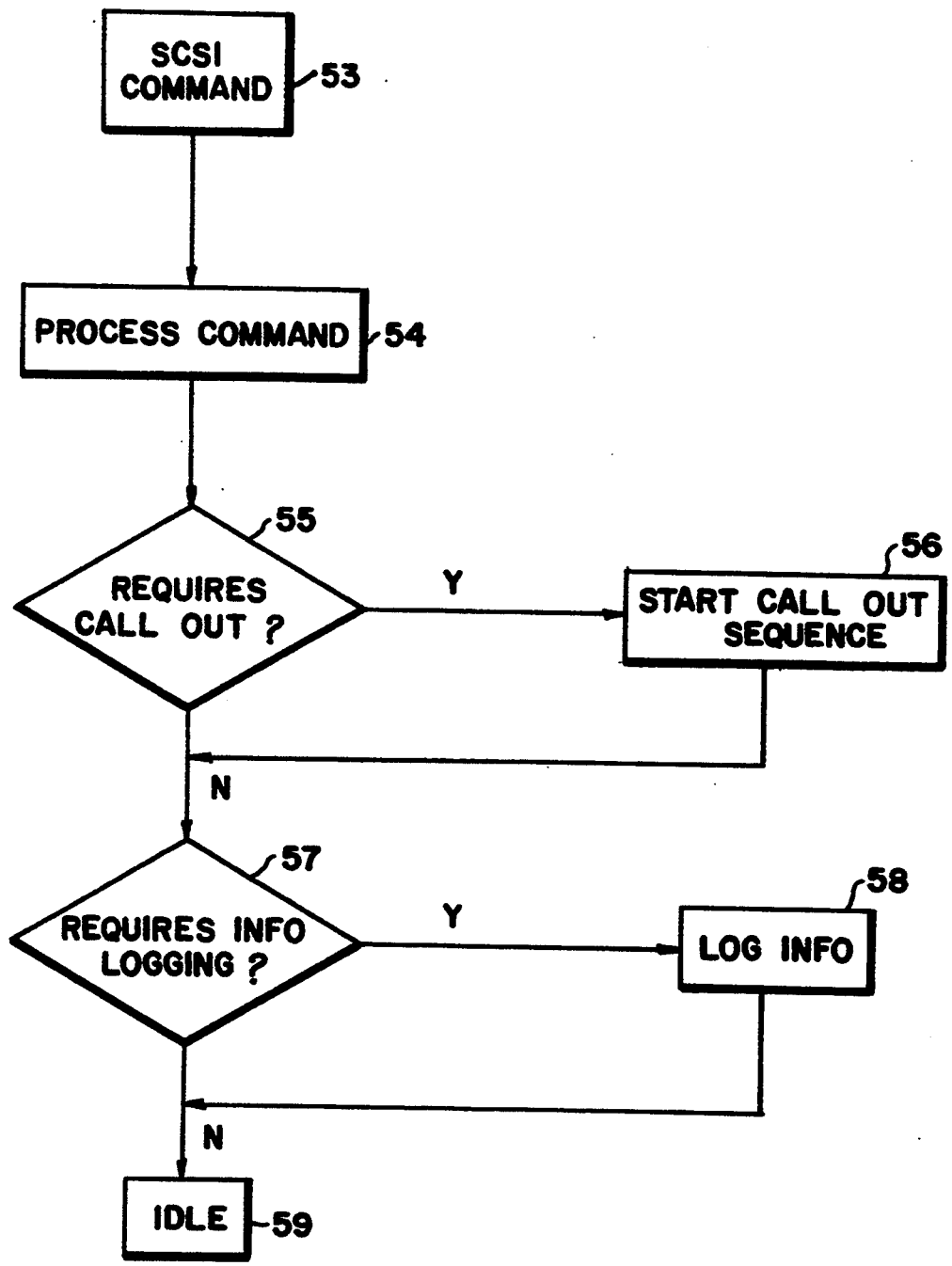
FIG. 4 is a flow chart showing the general operation of the decryption controller of FIG. 2 in response to an SCSI command from the host computer.

FIG. 4 illustrates how an SCSI command from the host computer is treated by the decryption controller. When an SCSI command is received (Block 53) it is analyzed and processed (Block 54) by the decryption controller. Typical SCSI commands are set forth in Table II:

TABLE II

Get Financial Account Information
Get Purchased Item Information
Assent/Don't Assent to Purchase Item
Log In
Log Out
Poll for an Asynchronous Event (such as an "on sale" notice) Set User's Default Billing Reference (e.g., last billing reference number used)
Purchase Item
Get Decryption Controller Status (i.e., error codes)
Get User Information (i.e., currently logged-in user)
Receive Decrypted Data Certain PC commands require the decryption controller to call the central billing computer via the telephone modem. For example, if the financial account is decremented to zero, the decryption controller will automatically call and request additional credit. In this case, the decryption controller makes the call (Block 55) and executes the call-out sequence (Block 56). In the call-out protocol, the decryption controller dials the number of the central billing facility and transmits both its telephone and identification (ID) numbers. This simple transmission requests an immediate call-back from the central computer during which the financial account is automatically updated.

Each telephone transaction, initiated by the central billing computer, preferably comprises three steps:

(1) A download to the central billing facility of the current financial account status, all billing transactions completed since the previous download, and the user information stored in the decryption controller;
(2) A transmission from the central billing facility to the decryption controller of any updates, such as changes in pricing information and the like; and
(3) A communication of all error codes from the decryption controller to the central billing facility which indicate that the decryption controller is not functioning properly.

In addition, the financial account balance in the decryption controller can be updated by the central billing facility. It can be credited, if payment was made to the central billing facility by the user, or debited, for example if a check was returned from the bank marked "insufficient funds".

Each billing transaction provided to the central billing facility preferably contains, at a minimum, the following information:

Time and Date of Decryption
Identification No. of Information Packet (IP)
Volume No. of CD-ROM
Information Owner or Distributor of IP
Type of IP (Classification)
Price Paid for IP
Billing Reference, if inserted by the User When an item (IP) is purchased by a user, and the decryption controller is able to complete this transaction by decrementing the financial account and decrypting the item, this transaction is logged into the flash memory 38 of the controller. In this case, the logging operation is flagged (Block 57) and carried out (Block 58) at the completion of the transaction. Thereafter, the decryption controller returns to the idle mode (Block 59).

Figure 5:
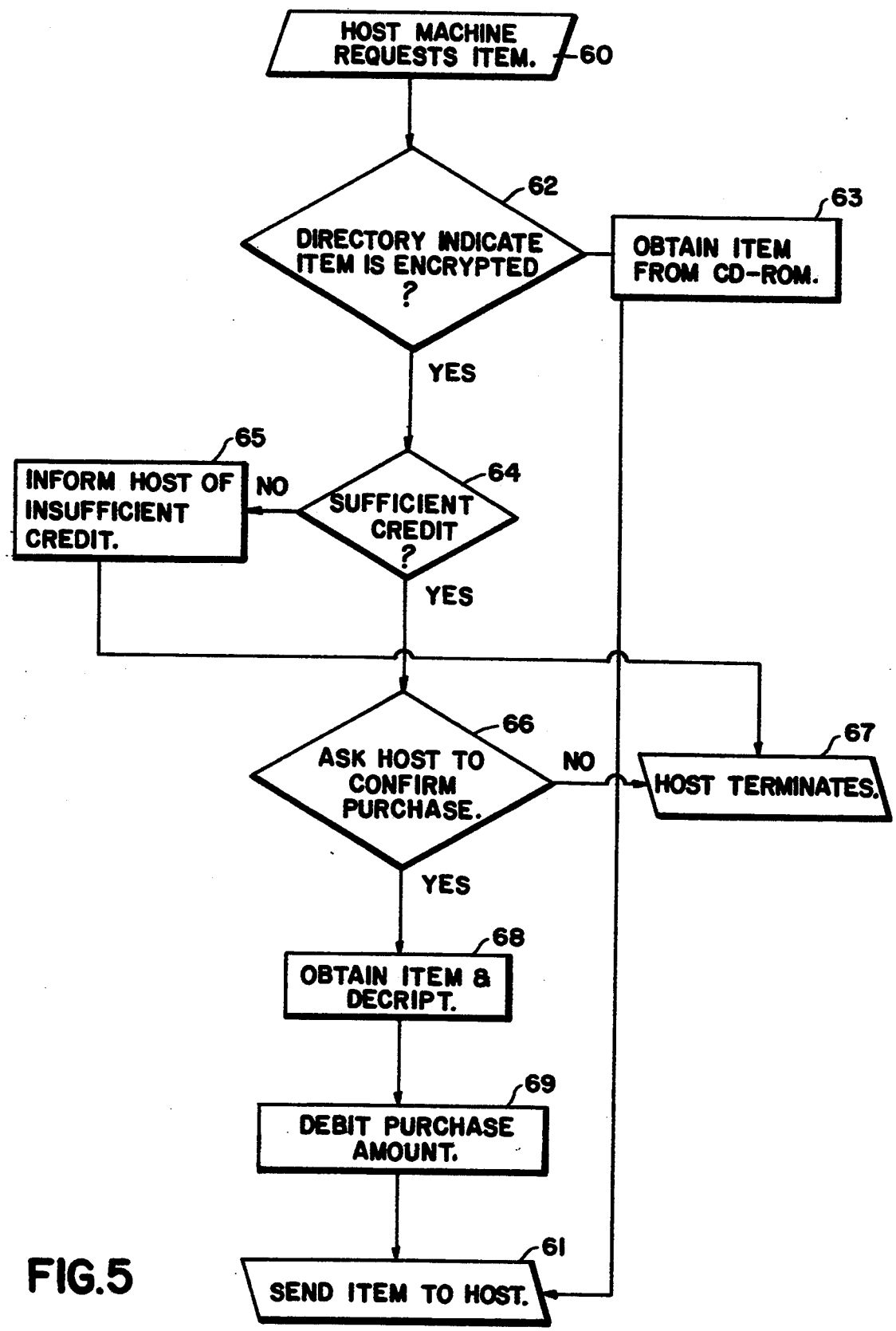
FIG. 5 is a flow chart showing the general operation of the decryption controller in response to an SCSI command to retrieve an item of information.

Referring to FIG. 5, the retrieval of an item (IP) commences with a request by the host computer 10 (Block 60). The host computer sends this request to the decryption controller 14 via the SCSI bus which processes the request and then sends the item to the host (Block 61), as if it were the CD-ROM reader. The host computer 10 thus addresses the decryption controller, rather than the CD-ROM reader; however, with the exception of this difference, the host computer operates in such a manner as if it were requesting the item of data directly from the CD-ROM reader. Thus, as far as the host computer 10 is concerned, the decryption controller is the CD-ROM reader; i.e., it is indistinguishable from, and "transparent" to the host computer.

The decryption controller initially queries the file directory of the CD-ROM to determine whether the item of information is encrypted (Block 62). If not, the decryption controller initiates a data request from the CD-ROM reader 12 (Block 63) in the same manner as if it were the host computer and reads the item into its own RAM memory. Thereafter, the data item is transferred to the host computer (Block 61).

If the file directory indicates that the desired item is encrypted, the decryption controller checks the user's financial account to determine if there is a sufficient positive balance to pay for the item (Block 64). If not, the decryption controller informs the host computer of the insufficient credit (Block 65).

If credit is sufficient, the decryption controller transmits the cost of the item to the host computer and asks the host to confirm the purchase (Block 66) by displaying the cost to the user and requesting a user response. If the user fails to accept the purchase, the transaction is terminated (Block 67).

If the host computer confirms the purchase of the item at the price indicated, the decryption controller initiates a data request to the CD-ROM reader. The item is thus caused to be read by the CD-ROM reader and it is transferred to the RAM of the decryption controller. Thereafter, the item is decrypted using the DES module and the decryption keys (Block 68). The purchase price of the item is then debited from the user's financial account (Block 69) and the decrypted item is transferred to the host computer (Block 61). Once the item of information has been supplied to the host computer in decrypted form, it is available for storage, both temporary and archival storage, and may be read and copied by the user, as desired.

Figure 6:
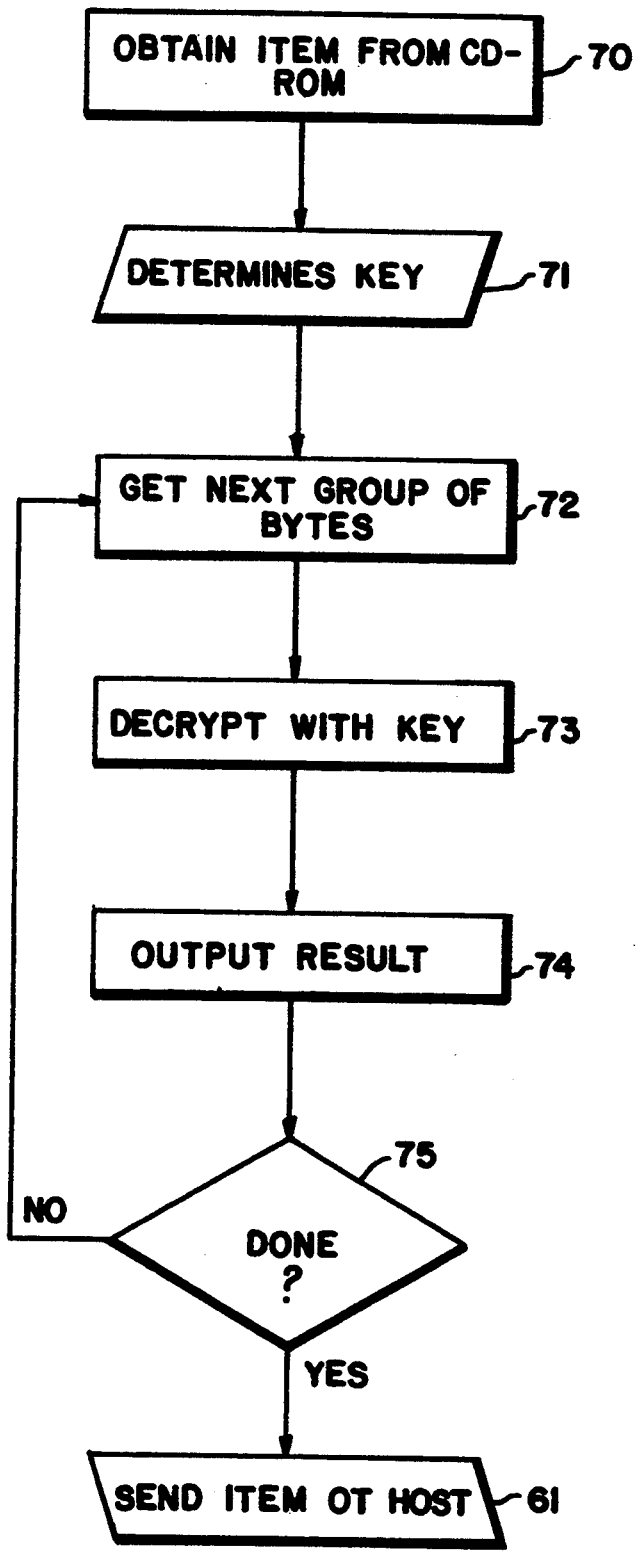
FIG. 6 is a flow chart showing the operation of the decryption controller in decrypting data.

FIG. 6 illustrates the detailed operation of the decryption controller of FIG. 2 in decrypting an item of information. As such, FIG. 6 represents the operation of Block 68 in FIG. 5.

As an initial step, the controller obtains the entire item of information (in encrypted form) from the CD-ROM (Block 70). Thereafter, the controller determines the decryption key (Block 71) for this item from key rules and key data which are available (e.g., stored) locally. Preferably, each separate item of information has a unique decryption key. The method of determining the key will be described in detail hereinafter in connection with FIG. 7.

Since the DES module 42 of the decryption controller processes (decrypts) only eight bytes of data at a time, a first group of eight bytes for the information item to be decrypted is initially transferred to the DES circuit (Block 72) and decrypted (Block 73). The result of this decryption—that is, the cleartext—is placed temporarily in RAM (Block 74) and the process is repeated (Block 75) until all bytes of data of the information item are decrypted. Thereafter, the entire information item in cleartext is transmitted to the host computer (Block 61).

Figure 7:
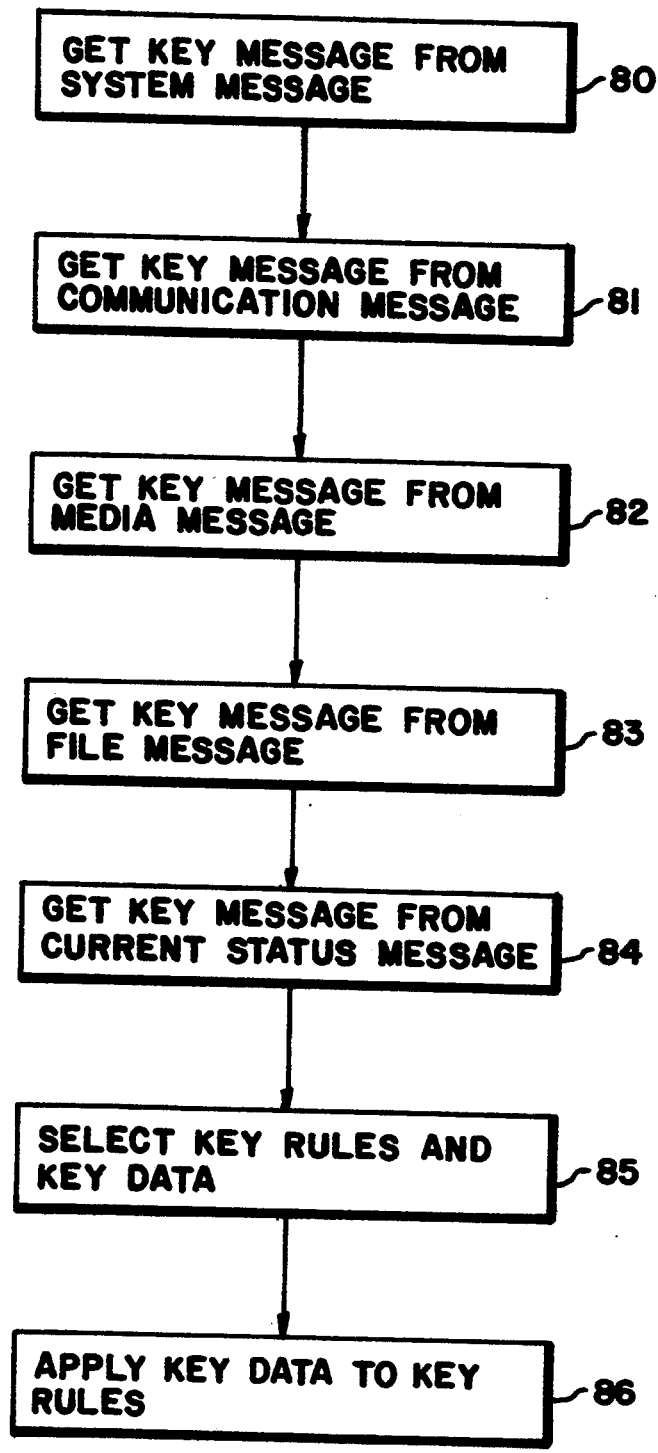
FIG. 7 is a flow chart showing the operation of the decryption controller in creating a decryption key.

FIG. 7 illustrates how the decryption key is determined from the key rules and the key data which are available locally for each separate item of information stored on the CD-ROM. In order to determine the key, it is necessary to obtain both the key rules and the key data for the specific item of information, and then to apply the rules to this data. Examples of both rules and data are given below.

The key rules and the key data are preferably obtained from one or more of the following five sources:

(1) Non-volatile storage of a "system message" within the decryption controller (flash memory);

(2) A "communication message" received from either the host computer, via the SCSI bus or RS232C interface, or the central billing facility via the telephone modem;

(3) A "media message" contained on the CD-ROM header which is generic to all the files stored thereon (for example, the volume number of the CD-ROM);

(4) A "file message" constructed from information on the file directory associated with the specific item of information (IP) to be decrypted (for example, the identity, length, location and date of the respective file) and/or the header portion of the IP itself; and (5) A "current status message" obtained from some element of the decryption controller (for example, the real time clock) or the host computer.

Referring to FIG. 7, it is seen that a "key message"—that is, the key rules and key data for generating a key—is obtained by retrieving a stored system message (Block 80), by retrieving a stored communication message (Block 81), by reading the media message from the CD-ROM (Block 82), by reading the file directory and header of the selected IP from the CD-ROM (Block 83), and by obtaining the current status of the decryption controller (Block 84). With this information, all of which is available locally at the user site, the key rules and key data are selected (Block 85). Thereafter, the key data is applied to the key rules (Block 86) to produce the decryption key.

By way of example and not limitation, the following key rules are suggested:

(1) Add the CD-ROM volume number from the media message to the length of the IP from the file message.

(2) Add the date from the media message to the date from the file message.

(3) Add the most recent communication message (initial vector) to the file location in the file message.

(4) Subtract the date found in the file message (date of creation of the IP) from the current status (present date). If the result is positive and less than one year, proceed to decrypt. If the result is negative or more than one year, do not generate a key (do not decrypt).

Other combinations of key rules and key data will readily occur to those skilled in the art.

There has thus been shown and described a novel system for retrieving secure information from a mass storage medium which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. Apparatus for retrieving information packets from a mass storage device, at least some of which information packets are stored in said mass storage device in encrypted form, said apparatus comprising, in combination:

(a) a digital bus that transmits address information, control information and data from a call initiating unit, connected to said bus, to one or more call receiving units, connected to said bus, wherein each unit connected to said bus has an associated bus address;

(b) a host computer connected to said bus and having a first address;

(c) a mass storage device connected to said bus and having a second address; and (d) a decryption controller connected to said bus and having a third address, said decryption controller including:

(1) a control unit for controlling the operation of said decryption controller;

(2) a memory; and (3) means for decrypting encrypted information;

wherein the host computer has stored therein said third address as the address of said mass storage device and sends information requests via said bus to said decryption controller in lieu of said mass storage device; and wherein said decryption controller by means of said control unit receives information requests from said host computer and executes said information requests by sending information requests via said bus to said mass storage device, storing in said memory information packets received from said mass storage device in response to said information requests, decrypting encrypted portions of said information packets, if any, by said decryption means and transmitting said information packets, in decrypted form, to said host computer.

2. The apparatus defined in claim 1, wherein the digital bus is a small computer system interface bus.

3. The apparatus defined in claim 1, wherein said decryption controller further comprises a financial account register, wherein said decryption controller by means of said control unit debits the contents of said register when an information packet is decrypted, and wherein said decryption controller further decrypts encrypted portions of said information packets only when said financial account has a positive balance.

* * * * *